Nov. 24, 1970 J. E. COURTNEY 3,543,012
UNIVERSAL DIGITAL FILTER AND FUNCTION GENERATOR
Filed July 10, 1968
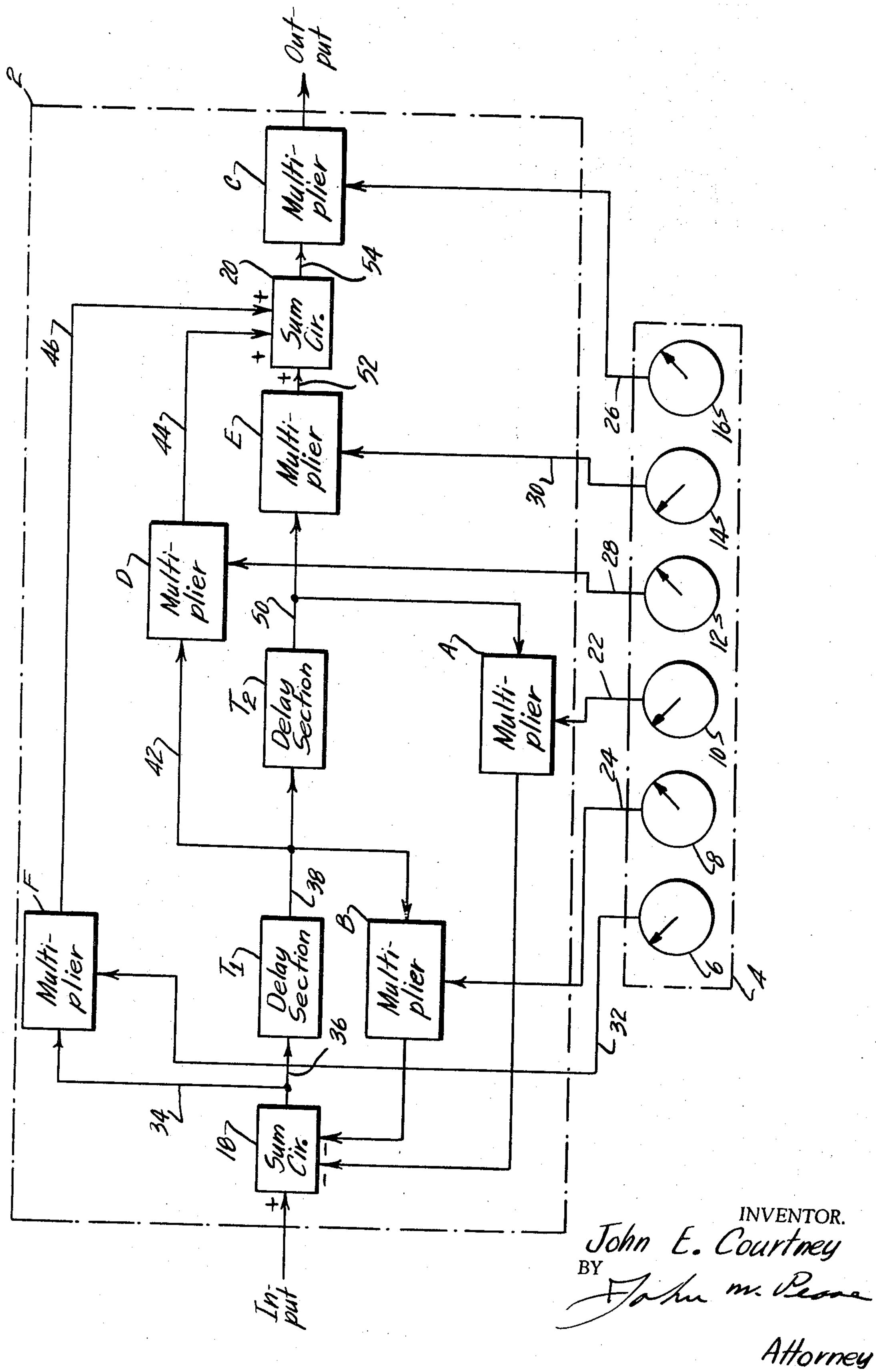
INVENTOR.
John E. Courtney
BY John M. Pease
Attorney 3,543,012

UNIVERSAL DIGITAL FILTER AND FUNCTION GENERATOR

John E. Courtney, Haddonfield, N.J., assignor, by mesne assignments to the United States of America as represented by the Secretary of the Navy Filed July 10, 1968, Ser. No. 743,735
Int. Cl. G06b 15/34
Int. Cl. 235—197 3 Claims

ABSTRACT OF THE DISCLOSURE

An adjustable digital filter and function generator comprised of logic elements and control means. The control means may be adjusted so that the combination functions to filter digital information within a selected range or to generate a selected function.

BACKGROUND OF THE INVENTION

In the past, digital filters have been constructed which are capable of filtering digital information within prescribed ranges. Digital function generators have also been constructed. These function generators and filters have generally been built to fit a particular application. That is, they have been built as an element of a particular apparatus and have no usefulness outside that or a similar apparatus. The present invention fills a need for a universal type digital filter which may be adjusted to filter information over several selected ranges or to generate a selected one of several functions. It may thus be constructed as a standard "off-the-shelf" element and may be utilized as a component of any of a great variety of devices by adjusting it to perform the required task.

SUMMARY OF THE INVENTION

The invention is a universal digital filter and function generator which may be adjusted to filter signals in digital form over any of several frequency ranges or to generate any of several functions. A plurality of summers, multipliers and delays are combined with control means in such manner that the control means may be adjusted to alter the operation of the circuit to function as desired.

BRIEF DESCRIPTION OF THE DRAWING

The drawing is a block diagram of the invention.

DESCRIPTION OF THE PREFERRED EMBODIMENT

The drawing shows a digital filter and function generator in a unit 2 outlined by a dotted line. A controlling means 4 has individual control elements represented by rotatable knobs 6, 8, 10, 12, 14, and 16 connected respectively to gate controlled multipliers A, B, C, D, E, and F through respective lines 22, 24, 26, 28, 30, and 32. The input to the apparatus is connected to an input summing circuit 18 where it is summed with a feedback signal from multiplier B, and a feedback signal from multiplier A. The output of input summing circuit 18 is connected by respective lines 34 and 36 to the inputs of multiplier F and a delay circuit section $T_1$. The output of $T_1$ is connected by line 38 to the inputs of a second delay circuit section $T_2$, and by lines 40 and 42 to multiplier B and multiplier D. The delay circuit means $T_1$ and $T_2$ provide delay means for the periodic sample input signals received through summing circuit 18. Multiplier D has an output connected by line 44 to an input of an output summing circuit 20. The output of multiplier F is also connected by line 46 to a second input of output summing circuit 20. The output of $T_2$ is connected by line 48 to the input of multiplier A and by line 50 to multiplier E which has an output connected by line 52 to a third input of output summing circuit 20. The output of output summing circuit 20 is connected by line 54 to the input of multiplier C, the output of which is the output of the apparatus. Multiplier C provides amplification to the output signal. The output summing circuit 20 is provided to weigh the delayed reference signals. Multipliers D and F, connected respectively from the delay circuit and said input summing circuit to said output summing circuit, weigh the once delayed signal and the reference signal respectively. The direction of signal flow through the connections between elements is indicated by arrows. The sign of a particular signal applied to each of summing circuits 18 and 20 is indicated by a plus or minus symbol adjacent the arrowhead at the summing circuit input. For example, the inputs to summing circuit 18 from multipliers A and B each have a "—" sign. The use of a single pair of delay circuit sections $T_1$ and $T_2$ limit the slopes which it is possible to build into the filters. However, any higher order filter may be made by cascading two or more of the units shown.

When the apparatus in unit 2 is used as a filter, a signal is sampled periodically and put in digital form at sampling intervals having a duration of T seconds. The sampled information is applied to the input of summing circuit 18. When the apparatus is used as a function generator the function is initiated by applying a single sample of value "1" at the input to 18, and returning to zero for all succeeding sample periods. This is the equivalent of applying a unit impulse to an analog device. The generated functions are given in Table I hereinafter as continuous functions of time but the output is actually these functions sampled at intervals of T. The particular frequencies passed when the apparatus in unit 2 is used as a filter or the function generated when used as a function generator are determined by the settings of knobs 6, 8, 10, 12, 14, and 16, in control means 4. These settings determine the factors by which the information entering multipliers A, B, C, D, E, and F, are multiplied.

In general the invention may be used to implement any device with an impulse response function which has a Laplace transform of the form $$\frac{a_0+a_1s+a_2s^2}{b_0+b_1s+b_2s^2}$$

The Laplace transform of the device is $$\frac{C(F+De^{-st}+Ee^{-2st})}{1+Be^{-st}+Ae^{-2st}}$$

where $e^{-st}$ is the laplace transform of the delay circuits. Therefore the Z transform of the system is $$\frac{C(E+ZD+Z^2F)}{A+BZ+Z^2}\quad Z=e^{st}$$

To generate a time function one would refer to a table of Z-transforms and select the Z-transform for the time function desired and adjust the multipliers A, B, C, D, E, and F, to match that particular Z-transform.

This includes the filters mentioned before as well as oscillators (sine wave generators).

The following Tables I and II are given as examples of multiplier constants respectively for function generation and filter forms:

TABLE I

| | Multiplier constants | | | | | |
|---|---|---|---|---|---|---|
| | A | B | C | D | E | F |
| Function to be generated: | | | | | | |
| at (ramp) | 1 | −2 | aT | 1 | 0 | 0 |
| $e^{-at}$ | 0 | $-e^{-aT}$ | 1 | 0 | 0 | 1 |
| $te^{-at}$ | $e^{-2aT}$ | $-2e^{-aT}$ | $Te^{-aT}$ | 1 | 0 | 0 |
| $1-e^{-at}$ | $e^{-aT}$ | $-(1+e^{-aT})$ | $1-e^{-aT}$ | 1 | 0 | 0 |
| $e^{-at}-e^{-bt}$ | $e^{-(a+b)T}$ | $-(e^{-aT}+e^{-bT})$ | $e^{-aT}-e^{-bT}$ | 0 | 0 | 1 |
| $(1-at)e^{-at}$ | $e^{-2aT}$ | $-2e^{-aT}$ | 1 | $-e^{-aT}(1+aT)$ | 0 | 1 |
| $be^{-bt}-ae^{-at}$ | $e^{-(a+b)T}$ | $-(e^{-aT}+e^{-bT})$ | $b-a$ | $-be^{-at}-ae^{-bt}/b-a$ | 0 | 1 |
| Sin at [1] | 1 | −2cos aT | 1 | sin aT | 0 | 0 |
| Cos at | 1 | −2cos aT | 1 | −cos aT | 0 | 1 |
| Sinh at [1] | 1 | −2 cosh aT | 1 | sinh aT | 0 | 0 |
| Cosh at | 1 | −2 cosh aT | 1 | −cosh aT | 0 | 1 |
| $e^{-at}$ cos bt | $e^{-2aT}$ | $-2e^{-aT}$ (cos bT) | 1 | $-e^{-aT}$ cos bT | 0 | 1 |
| $e^{-at}$ sin bt [1] | $e^{-2aT}$ | $-2e^{-aT}$ (cos bT) | 1 | $e^{-aT}$ sin bT | 0 | 0 |

[1] Constants C and D are interchangeable for this function.

TABLE II

| | Multiplier constants | | | | | |
|---|---|---|---|---|---|---|
| Filter form | A | B | C | D | E | F |
| Low pass (−6 db/octave slope) | 0 | $\frac{\beta-1}{\beta+1}$ | $\frac{\beta}{\beta+1}$ | +1 | 0 | 1 |
| Low pass (−12 db/octave slope) | $\left(\frac{\beta-1}{\beta+1}\right)^2$ | $\frac{2(\beta-1)}{\beta+1}$ | $\frac{\beta^2}{(\beta+1)^2}$ | 2 | 1 | 1 |
| Band pass | $\frac{\alpha\beta+\alpha-\beta+1}{\alpha\beta-\alpha+\beta+1}$ | $\frac{2(\alpha\beta-1)}{-\ +\ +1}$ | $\frac{\beta-\alpha}{-\ +\ +1}$ | 0 | −1 | 1 |
| Band reject | $\frac{\alpha\beta-\alpha+\beta+1}{\alpha\beta+\alpha-\beta+1}$ | $\frac{2(\alpha\beta-1)}{\alpha\beta+\alpha-\beta+1}$ | $\frac{\alpha\beta+1}{\alpha\beta+\alpha-\beta+1}$ | $2\left(\frac{\alpha\beta-1}{\alpha\beta+1}\right)$ | 1 | 1 |
| High pass (6 db/octave slope) | 0 | $\frac{\beta-1}{\beta+1}$ | $\frac{1}{\beta+1}$ | −1 | 0 | 1 |
| High pass (12 db/octave slope | $\left(\frac{\beta-1}{\beta+1}\right)^2$ | $\frac{2(\beta^2-1)}{(\beta+1)^2}$ | $\frac{1}{(\beta+1)^2}$ | −2 | 1 | 1 |

Table I lists the values of the multiplier constants by which the information entering multipliers A, B, C, D, E, and F is multiplied in order to generate certain functions. The functions to be generated are listed in the left hand column and the multiplier constants are listed in the columns headed by the multiplier designations A, B, C, D, E, and F. For example, to generate a ramp function "*at*," the knobs 6, 8, 10, 12, 14, and 16, of control means 4 are set to insert a multiplier constant having the value "1" in multiplier A, a "−2" in multiplier B, the value "*a*T," etc.

Table II shows the values of the multiplier constants set into the multipliers by the control means to filter selected frequencies. In Table II, $\alpha=\tan(aT/2)$ and $\beta=\tan(bT/2)$ where $a$=lower cutoff frequency in radians/sec.
$b$=upper cutoff frequency in radians/sec.
T=sampling interval in seconds.

The conversion from $a$ and $b$ to $\alpha$ and $\beta$ is to compensate for the frequency scale distortion which occurs for frequencies near one-half the sampling frequency. Table II is self-explanatory. The filter form or range is indicated in the left hand column and the multiplier constants inserted in the multipliers for a particular filter form are indicated in the columns headed A, B, C, D, E, and F. For example, to cause the apparatus of unit 2 to function as a low pass filter, the information entering multiplier A is multiplied by the constant "0." The information entering multiplier B is multiplied by the constant $$\frac{\beta-1}{\beta+1}$$

which will have a value determined by the upper cutoff frequency selected.

In operation, digital information will be sampled for a first sampling interval and the sampled value will enter summing circuit 18 and be summed algebraically with feedback signals from multipliers A and B which at this time are both equal to zero. An output from 18 will be applied to the input of multiplier F, and, after multiplication by the multiplier constant inserted in F by control means 4, will be summed in summing circuit 20 with the outputs of multipliers D and E which at this time are equal to zero. The sum developed in 20 is fed to multiplier C, and the product of this sum and the multiplier constant stored in C is fed to the output of the apparatus. The value entered in summing circuit 18 will be summed with a feedback signal from multiplier B. This feedback signal is the value entered into 18 during the first sampling interval which has been delayed in delay circuit $T_1$, multiplied by the multiplier constant stored in B. The sign of this product is reversed as it enters summing circuit 18 as indicated by the minus signs on the inputs to 18 from A and B. The algebraic sum of the output of 18 is multiplied by F and the product is summed in 20 with inputs from D and E. The input from D at this time will be a product of the multiplier constant stored in D and the input from the first sampling interval as delayed in $T_1$. During the third and subsequent sampling intervals there will be a delayed output from $T_2$ which is multiplied by the constant stored in multiplier E and by the constant stored in multiplier A. The products are summed in summing circuits 20 and 18 respectively. It can be seen that if the multiplier constants listed in Tables I and II are stored in the multipliers, that the listed function will be developed or the listed filtering action will occur. When generating a function, as noted before, a single signal of value "1" is entered into 18 during the first sampling interval and zero values are entered during the subsequent intervals.

The elements of this invention such as the summing circuits, delays, multipliers, and control means comprise well known devices readily available as "off-the-shelf" items.

The invention may be used for any digital signal processing task in which filtering must be performed on data or signals in digital form, or where analog filters are difficult to construct, as high-Q filters in the low audio region, or where any of the possible generated functions are desired as inputs to other equipment.

It will be understood that various changes in the details and arrangements of parts, which have been herein described and illustrated in order to explain the nature of the invention, may be made by those skilled in the art within the principle and scope of the invention as expressed in the appended claims.

I claim:

1. A universal digital filter and function generator unit for devices having an impulse response function which has a Laplace transform of the form $$\frac{a_0+a_1s+a_2s^2}{b_0+b_1s+b_2s^2}$$

comprising (a) an input summing circuit for receiving reference input signals in digital form and feedback signals, (b) delay circuit means including at least two delay sections connected in series to said input summing circuit for delaying the output of said summing circuit output signals, (c) a first multiplier circuit, (d) an output summing circuit connected through said first multiplier to said delay circuit means to weigh the delayed reference signal, (e) a second multiplier circuit connected to said output summing circuit to provide an amplified output signal, (f) additional multiplier circuits connected one each from said delay circuit sections to said input summing circuit to provide feedback control, (g) at least two further multiplier circuits connected respectively from said delay circuit and said input summing circuit directly to said output summing circuit to weigh the once delayed signal and said reference signal respectively, (h) the several multiplying circuits constituting said first, second additional and further multiplier circuits providing the multiplier constants in the Z-transform of the system represented by $$\frac{C(E+ZD+Z^2F)}{A+BZ+Z^2}$$

(i) a plurality of selectively adjustable logic level controlling means connected respectively one to each of said several multipliers to selectively set said unit for desired function.

2. A unit according to claim 1, (a) said delay circuit means including two delay circuit sections connected in series, (b) said additional multipliers including two multipliers connected to said input summing circuit respectively from the outputs of said respective delay circuit sections.

3. A unit according to claim 2, (a) each of said several multipliers being gated, (b) said controlling means being operable to selectively control the gates of each of said several multipliers to provide the necessary multiplication factors for the circuit function desired.

References Cited

UNITED STATES PATENTS

| | | | |
|---|---|---|---|
| 2,567,532 | 9/1951 | Stephenson | 235—184 |
| 3,167,649 | 1/1965 | Walp | 235—194 |
| 3,250,898 | 5/1966 | Vasu | 235—194 X |
| 3,305,676 | 2/1967 | Honore et al. | 235—197 |
| 3,351,749 | 11/1967 | Smith | 235—197 |
| 3,445,643 | 5/1968 | Schmoock et al. | 235—194 |

MALCOLM A. MORRISON, Primary Examiner

J. F. RUGGIERO, Assistant Examiner

U.S. Cl. X.R.

235—150.53